United States Patent
Hirayama (10) Patent No.: US 11,143,890 B2
(45) Date of Patent: Oct. 12, 2021

(54) LIQUID CRYSTAL OPTICAL MODULATION DEVICE AND LIQUID CRYSTAL OPTICAL MODULATION METHOD (71) Applicant: TOPPAN PRINTING CO., LTD., Tokyo (JP)

(72) Inventor: Ryuichi Hirayama, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 16/592,390

(22) Filed: Oct. 3, 2019

(65) Prior Publication Data

US 2020/0033655 A1 Jan. 30, 2020

Related U.S. Application Data (63) Continuation of application No. PCT/JP2018/014449, filed on Apr. 4, 2018.

(30) Foreign Application Priority Data

Apr. 5, 2017 (JP) .............................. JP2017-075147

(51) Int. Cl.
*G02F 1/133* (2006.01)
*E06B 9/24* (2006.01)
*G02F 1/1334* (2006.01)

(52) U.S. Cl.
CPC ............ *G02F 1/13306* (2013.01); *E06B 9/24* (2013.01); *G02F 1/1334* (2013.01); *E06B 2009/247* (2013.01); *E06B 2009/2464* (2013.01)

(58) Field of Classification Search
CPC .... E06B 9/24; E06B 2009/2464; G02F 1/133; G02F 1/13306; G02F 2001/133607; G02F 1/133606; G02F 1/133602–2001/133614; G02F 1/1334; G02B 6/005; G02B 6/0033–0063
See application file for complete search history.

(56) References Cited

U.S. PATENT DOCUMENTS 5,153,760 A * 10/1992 Ahmed ............... G02F 1/13318
349/1
5,751,258 A 5/1998 Fergason
2007/0195033 A1* 8/2007 Hayashi .............. G02F 1/13718
345/87

(Continued)

FOREIGN PATENT DOCUMENTS

EP 2256545 A1 1/2010
JP 2013-72895 4/2013

(Continued)

OTHER PUBLICATIONS

English Translation by WIPO of the International Preliminary Report on Patentability dated Oct. 17, 2019 in corresponding International Patent Application No. PCT/JP2018/014449.

(Continued)

*Primary Examiner* — Mariam Qureshi (57) ABSTRACT

There is provided a liquid crystal optical modulation device that performs light control drive of a liquid crystal panel, the device including an optical modulation control section that switches and sets a frequency of a drive voltage in the form of a rectangular wave applied to the liquid crystal panel in accordance with a range of the drive voltage.

6 Claims, 6 Drawing Sheets

(56) References Cited

U.S. PATENT DOCUMENTS

| | | | |
|---|---|---|---|
| 2008/0252822 A1* | 10/2008 | De Koning | ........... G02F 1/1334 349/88 |
| 2011/0249219 A1 | 10/2011 | Evans et al. | |
| 2016/0363799 A1* | 12/2016 | West | ....................... G02F 1/172 |
| 2019/0243174 A1* | 8/2019 | Ishii | .................... G02F 1/13439 |

FOREIGN PATENT DOCUMENTS

| | | |
|---|---|---|
| JP | 2015-197637 | 11/2015 |
| JP | 2016-194627 | 11/2016 |

OTHER PUBLICATIONS

International Search Report dated Jun. 26, 2018, in corresponding International Patent Application No. PCT/JP2018/014449.
Written Opinion of the International Searching Authority dated Jun. 26, 2018 in corresponding International Patent Application No. PCT/JP2018/014449.
Extended European Search Report dated Jul. 15, 2020 in related European Patent Application No. 18780806.8 (11 pages).

\* cited by examiner

F I G. 1

F I G. 2

| Frequency \ Drive voltage | 20-25V | 26-30V | 31-35V | 36-40V | 41V- | Consumption current at 40V (1Hz is regarded as 1) |
|---|---|---|---|---|---|---|
| 1Hz | B | B | A | A | A | 1 |
| 30Hz | B | A | A | A | A | 30 |
| 60Hz | A | A | A | A | A | 60 |
| 100Hz | A | A | A | A | A | 100 |

LIQUID CRYSTAL OPTICAL MODULATION DEVICE AND LIQUID CRYSTAL OPTICAL MODULATION METHOD

CROSS-REFERENCE TO RELATED APPLICATIONS

This application is a Continuation Application of PCT Application No. PCT/JP2018/014449, filed Apr. 4, 2018 and based upon and claiming the benefit of priority from Japanese Patent Application No. 2017-075147, filed Apr. 5, 2017, the entire contents of all of which are incorporated herein by reference.

FIELD

The present invention relates to a liquid crystal optical modulation device and a liquid crystal light modulation method, particularly suitable for performing gradation control of a liquid crystal panel particularly using PHM (pulse height modulation) in the form of a rectangular wave.

BACKGROUND

In a known technology that has been proposed (e.g., Patent Literature 1), the ratio of a non-operating state to an operating state of polymer dispersed-type liquid crystal is reduced compared to a case in which an AC voltage from a commercial power source is applied directly to a transparent electrode, so that high transparency can be achieved.

PATENT LITERATURE

Patent Literature 1: Jpn. Pat. Appln. KOKAI Publication No. 2013-072895

Figure 7A:
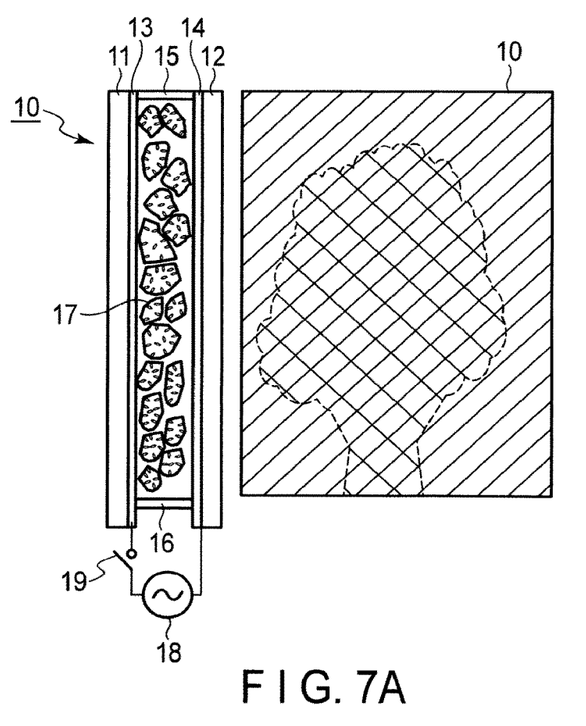
FIG. 7A is a diagram showing a structure of a window glass using a general polymer dispersed liquid crystal and a light-controlled state (at a power-off state).
Figure 7B:
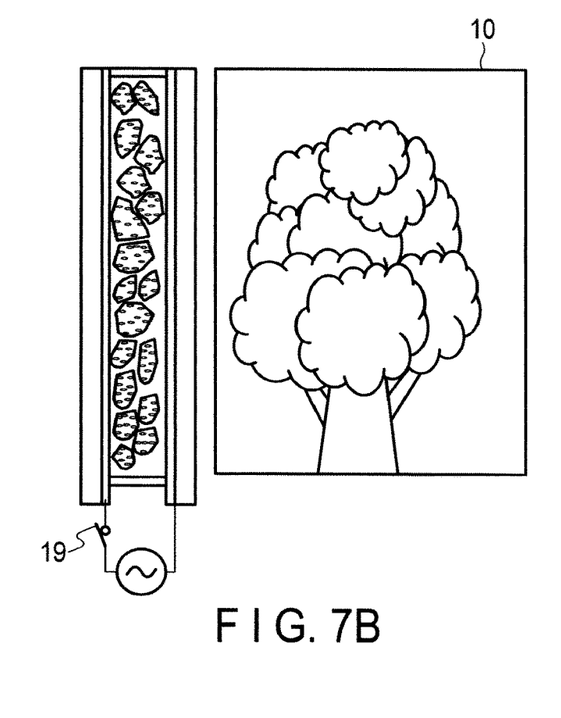
FIG. 7B is a diagram showing a structure of a window glass using a general polymer dispersed liquid crystal and a light-controlled state (at a power-on state).

FIGS. 7A and 7B illustrate a general configuration in which a polymer dispersed-type liquid crystal panel is applied to a window glass 10 having a simple blind function.

FIG. 7A shows the power off state. The polymer dispersed liquid crystal 17 is sealed and filled in an inside defined by transparent electrodes 13 and 14 on inner surface sides of two parallel plate glasses 11 and 12 as substrates, and spacers 15 and 16. A commercial power source 18 and a switch 19 are connected to the transparent electrodes 13 and 14.

Here, because the switch 19 is off, no voltage from the commercial power source 18 is applied to the polymer dispersed liquid crystal 17 between the transparent electrodes 13 and 14. In the polymer dispersed liquid crystal 17, as shown in the figure, a large number of liquid crystal molecules along mesh-like polymer fibers inside are irregularly arranged, so that light cannot be transmitted through the two glass plates 11 and 12 and is scattered. Since the window glass 10 of this state scatters light as in the case of frosted glass and cannot transmit most of the light, the whole glass becomes white when seen from the indoor side. Therefore, for example, even if a tree is present outside the window glass 10, a silhouette of the tree will appear only vaguely.

FIG. 7B shows a state in which the switch 19 is turned on. A voltage is applied to the polymer dispersed liquid crystal 17 between the transparent electrodes 13 and 14 to form an electric field, and liquid crystal molecules in the polymer dispersed liquid crystal 17 are aligned with their major axes in the direction orthogonal to the glass surface. Accordingly, the two glass plates 11 and 12 transmit the light and become transparent. The whole of the window glass 10 in this state looks transparent when seen from the indoor side, and a tree present outside the window glass 10 is clearly visible.

FIGS. 7A and 7B show how the window glass 10 looks in the off state and the on state; however, in this type of window glass 10, it is possible to perform halftone driving, thereby performing light control driving for steplessly adjusting a semi-transparent condition between the scattering and the transmission.

Figure 8A:
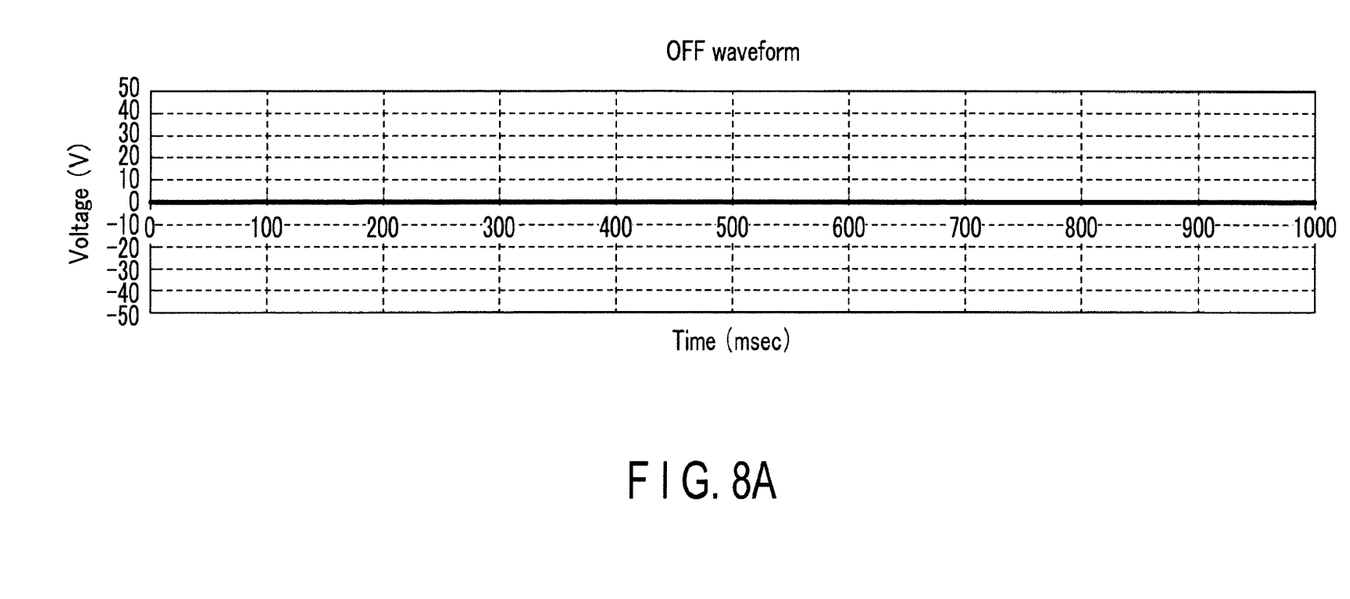
FIG. 8A is a diagram illustrating a waveform of a drive voltage of the polymer dispersed liquid crystal related to FIG. 7A.

FIG. 8A shows a voltage applied between the transparent electrodes 13 and 14 in the power-off state shown in FIG. 7A. As shown in the figure, since the switch 19 is turned off, 0 (zero) [V] is maintained.

Figure 8B:
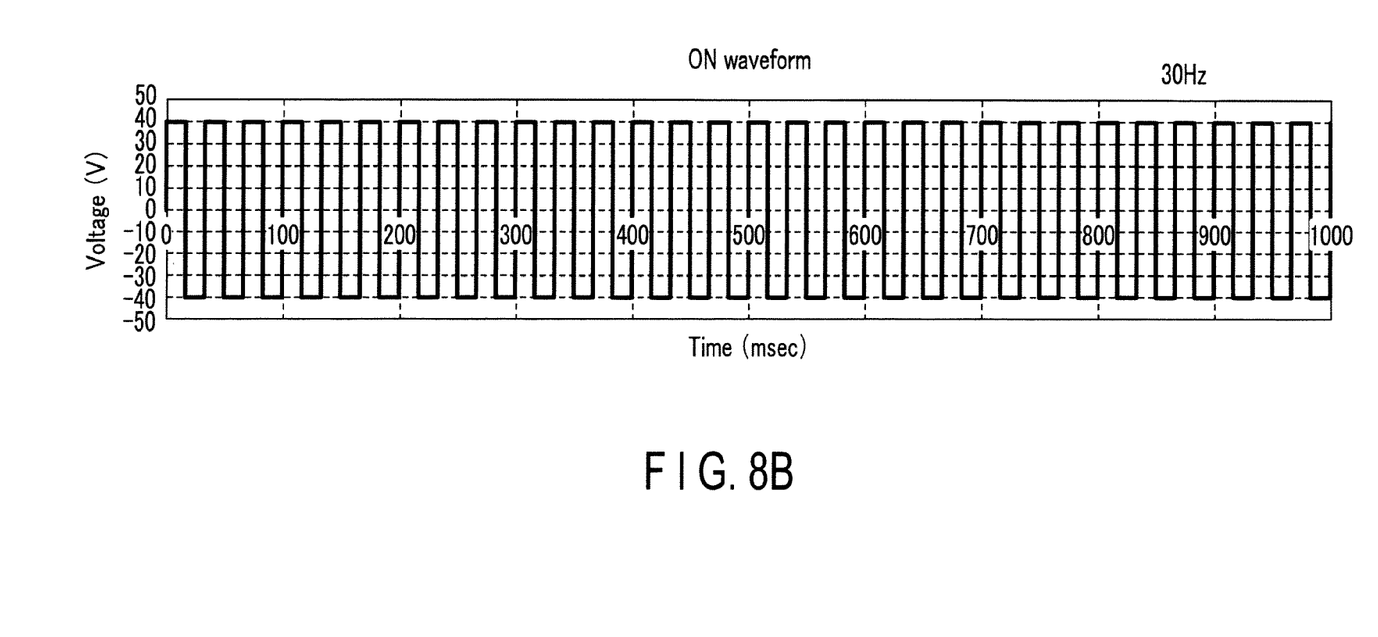
FIG. 8B is a diagram illustrating a waveform of a driving voltage of the polymer dispersed liquid crystal related to FIG. 7B.

FIG. 8B illustrates a voltage applied between the transparent electrodes 13 and 14 in the power-on state shown in FIG. 7B. Here, the figure shows a state where a [Hz] rectangular wave is amplified between a wave peak value +40 [V]/−40 [V]. Assuming that an effective voltage value at that time is denoted by Vc, an effective current value Ic is expressed by the following equation when resistance components are ignored.

$$Ic = 2\pi f C V c \qquad (1)$$

Where f: frequency, and C: capacitance of liquid crystal.

That is, it can be seen that the current consumption of this type of liquid crystal panel depends on the drive frequency, and the current consumption can be reduced by lowering the drive frequency.

For example, when the frequency f is set to 1 [Hz], no particular problem is caused in a state where light is scattered or transmissive, i.e., in a complete power-off state or a power-on state where a full voltage is applied, as shown in FIGS. 7A and 7B, or 8A and 8B; however, in the case of halftone driving using an intermediate voltage value, apparent flicker is visually recognized, causing a failure as a blind function.

Also in the above-mentioned patent document, in order to obtain high transparency, a technique is proposed in which a rectangular wave voltage is applied instead of a sinusoidal voltage of a commercial power supply to a liquid crystal optical modulation device having a liquid crystal layer using a polymer dispersed liquid crystal. However, the document describes a point of still causing flicker (flickering).

The appearing of flicker becomes more noticeably the lower the drive frequency and drive voltage are, which is contrary to the above described desire to lower the current consumption.

The present invention has been made in view of the actual situation described above, and an object of the present invention is to provide a liquid crystal optical modulation device and a liquid crystal optical modulation method which can realize control of the optical modulation of a liquid crystal panel with lower power consumption while suppressing the appearance of flicker.

SUMMARY

According to one aspect of the present invention, there is provided a liquid crystal optical modulation device that performs light control drive of a liquid crystal panel, the device comprising an optical modulation control section that switches and sets a frequency of a drive voltage in the form of a rectangular wave applied to the liquid crystal panel in accordance with a range of the drive voltage.

According to the present invention, it is possible to realize control of optical modulation of a liquid crystal panel with lower power consumption, while suppressing the appearance of flicker.

DETAILED DESCRIPTION

Hereinafter, an embodiment of the present invention will be described in detail.

[Configuration]

First, the configuration of the present embodiment will be described.

A liquid crystal optical modulation device according to the present invention can be realized, in the configuration shown in FIGS. 7A and 7B, by interposing a control section (optical modulation control section) 20 instead of a switch 19 between two lines connecting transparent electrodes 13, 14 and a commercial power supply 18.

Figure 1:
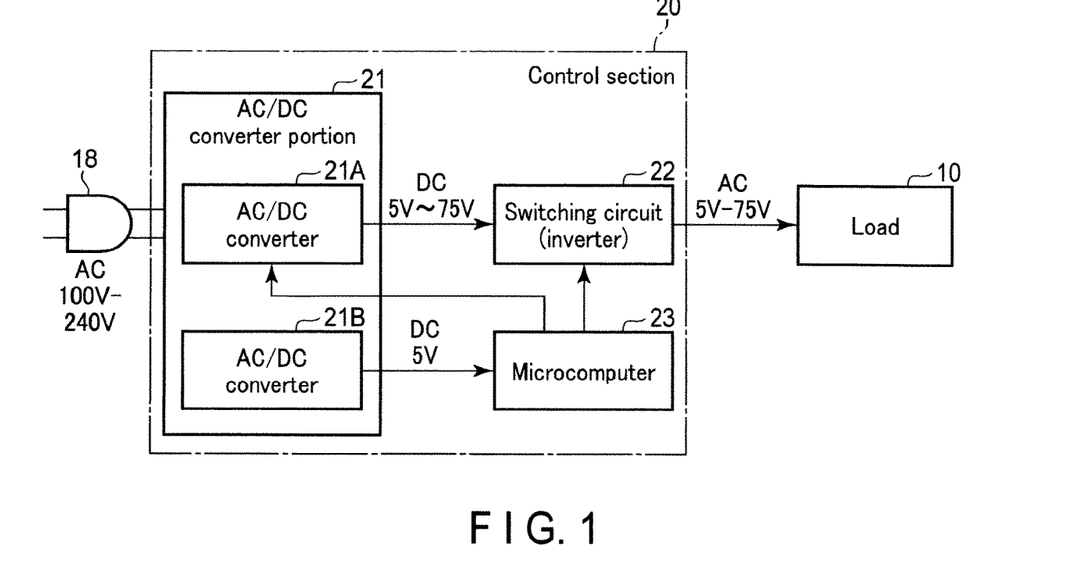
FIG. 1 is a block diagram showing a circuit configuration in a control circuit section according to an embodiment of the present invention.

FIG. 1 is a block diagram showing a circuit configuration of the control section 20. In the same figure, alternating-current power of 100 [V] to 240 [V] from the commercial power supply 18 is supplied to an AC/DC converter portion 21 of the control section 20. The AC/DC converter portion 21 includes two AC/DC converters 21A and 21B.

The AC/DC converter 21A is a variable output type AC/DC converter, rectifies the alternating-current power of 100 [V] to 240 [V] supplied from the commercial power supply 18 and reduces the voltage, in response to a control signal from a microcomputer 23 to be described later, converts the alternating-current power into direct-current power of 5 [V] to 75 [V], and outputs the direct-current power to a switching circuit 22.

Another AC/DC converter 21B is a fixed output AC/DC converter, rectifies the alternating-current power of 100 [V] to 240 [V] supplied from the commercial power supply 18 and reduces the voltage, converts the alternating-current power to direct-current power of a fixed value of 5 [V], and outputs the direct-current power to the microcomputer 23.

The microcomputer 23 operates with direct-current power of 5 [V] supplied from the AC/DC converter 21B, receives an operation via an operation unit (not shown), e.g., a dial switch, and performs a control operation in the control section 20, specifically, outputs control signals to the AC/DC converter 21A and the switching circuit 22.

That is, the microcomputer 23 outputs a control signal for controlling the direct-current voltage value output from the AC/DC converter 21A to the AC/DC converter 21A, using, for example, a PWM (pulse width) signal, etc.

Furthermore, the microcomputer 23 controls, for the switching circuit 22, a frequency of the alternating-current power output from the switching circuit 22, using, for example, a drive control signal based on a switching pulse.

The switching circuit 22 is an inverter circuit, and oscillates the direct-current power of a variable voltage supplied from the AC/DC converter 21A so as to have a drive frequency in accordance with the drive control signal from the microcomputer 23, and converts it into alternating-current power, and then supplies the alternating-current power to a liquid crystal panel serving as a load, such as the window glass 10.

First Operation Example

Figure 2:
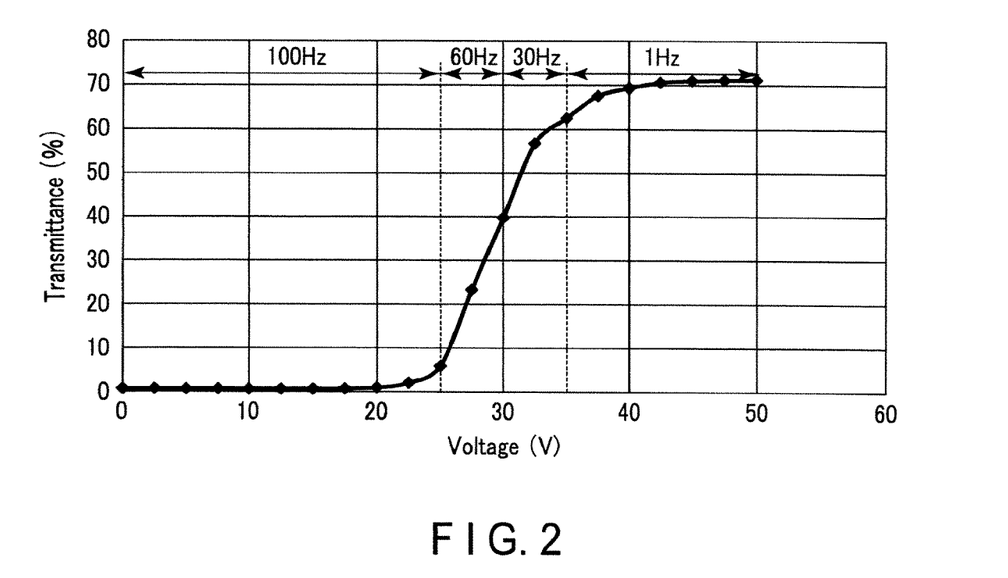
FIG. 2 is a diagram illustrating the relationship between a voltage applied to a liquid crystal panel related to a first operation example of the embodiment and a transmittance through a liquid crystal panel.

FIG. 2 is a diagram illustrating the relationship between a voltage applied to the liquid crystal panel serving as a load and the transmittance of the liquid crystal panel, in the control section 20. If the same figure is explained assuming that the applied voltage is controlled in units of 1 [V], the frequency of a rectangular wave at a voltage of 0 (zero) [V] to 25 [V] applied to the liquid crystal panel is set to 100 [Hz]; the frequency of a rectangular wave at a voltage of 26 [V] to [V] is set to 60 Hz; the frequency of a rectangular wave at a voltage of 31 [V] to 35 [V] is set to 30 [Hz]; and the frequency of a rectangular wave at a voltage of 36 [V] to 50 [V] is set to 1 [Hz].

From when the applied voltage exceeds about 20 [V], the degree of increase in transmittance corresponding to the increase in voltage starts to change gradually and largely, and the degree of increase in transmittance corresponding to the increase in voltage greatly and largely changes in the range of the applied voltage of 25 [V] to 35 [V].

Then, at the applied voltage of 35 [V] to about 40 [V], the change in the degree of increase in transmittance corresponding to the increase in voltage has decreased as necessary, and has exhibited an S-shaped transmittance change characteristic as a whole.

Figure 3:
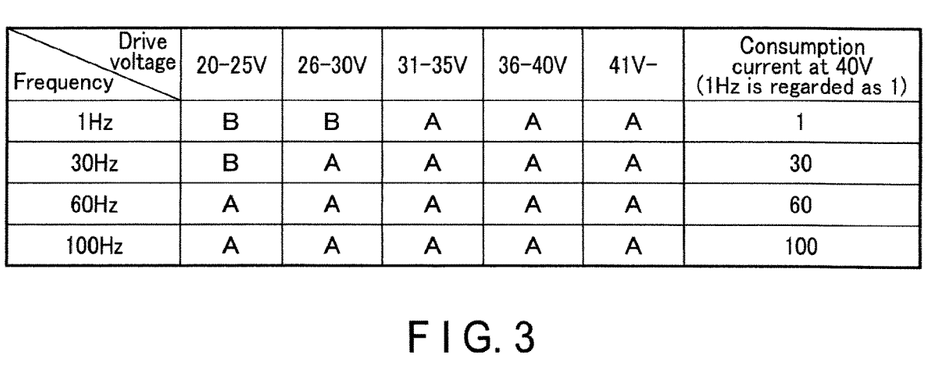
FIG. 3 is a diagram illustrating how flicker is seen when the liquid crystal panel according to the embodiment is sequentially driven with respective voltage values while changing the frequency of a rectangular wave.

FIG. 3 illustrates how flicker appears when the above-mentioned liquid crystal panel is sequentially driven at each voltage value while changing the frequency of the rectangular wave. In the same figure, the case where no flicker has been seen is indicated by "A", and the case where flicker has been seen is indicated by "B".

As described above, it can be understood that flicker appears more noticeably the lower drive frequency and drive voltage are.

In addition, in the same figure, the consumption current value at a drive voltage of 40 m is also described in the case where the same value at a drive frequency of 1 [Hz] is regarded as a unit "1", and as is shown by the above equation (1), it can be understood that the current consumption value increases in proportion to the drive frequency.

Figure 4:
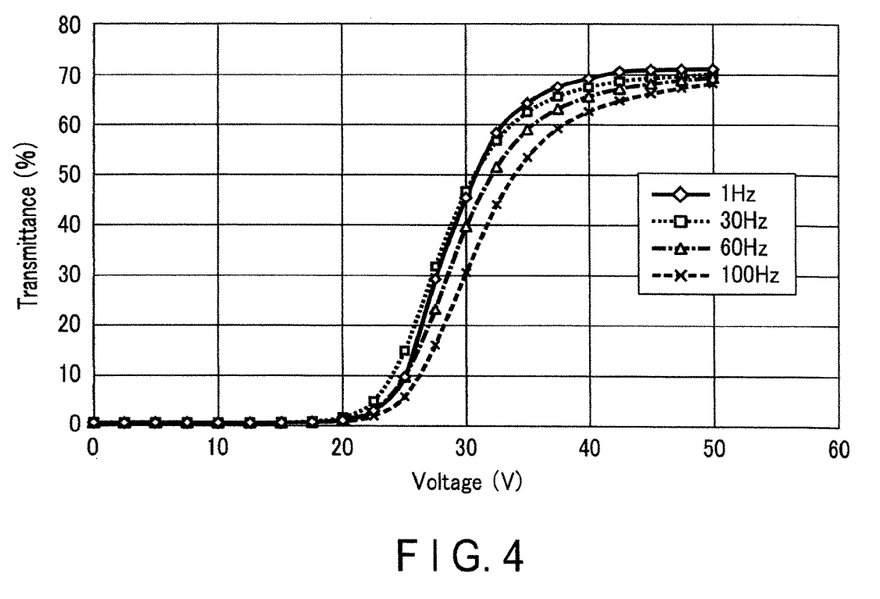
FIG. 4 is a diagram illustrating the relationship between a voltage applied to the liquid crystal panel for each drive frequency and a transmittance of the liquid crystal panel, which is the basis of the control contents according to the embodiment shown in FIG. 2.

FIG. 4 is a diagram illustrating the relationship between the voltage applied to the liquid crystal panel for each drive frequency and the transmittance of the liquid crystal panel, which is the basis of the control contents in the control section 20 shown in FIG. 2.

From the same figure, it can be understood that the lower the drive frequency, the higher the degree of increase in transmittance in accordance with the increase in drive voltage. If the appearance of flicker is not taken into account, it can be understood that it is advantageous to set a lower drive frequency also in terms of the consumption current.

However, in reality, flicker appears and the degree of visual recognition also varies depending on individual differences, so the results of selecting a frequency in accordance with the range of each drive voltage are as per the contents shown in FIG. 2.

As described above, it is possible to realize the control of the optical modulation of a liquid crystal panel with lower power consumption while suppressing the appearance of flicker.

Second Operation Example

Figure 5:
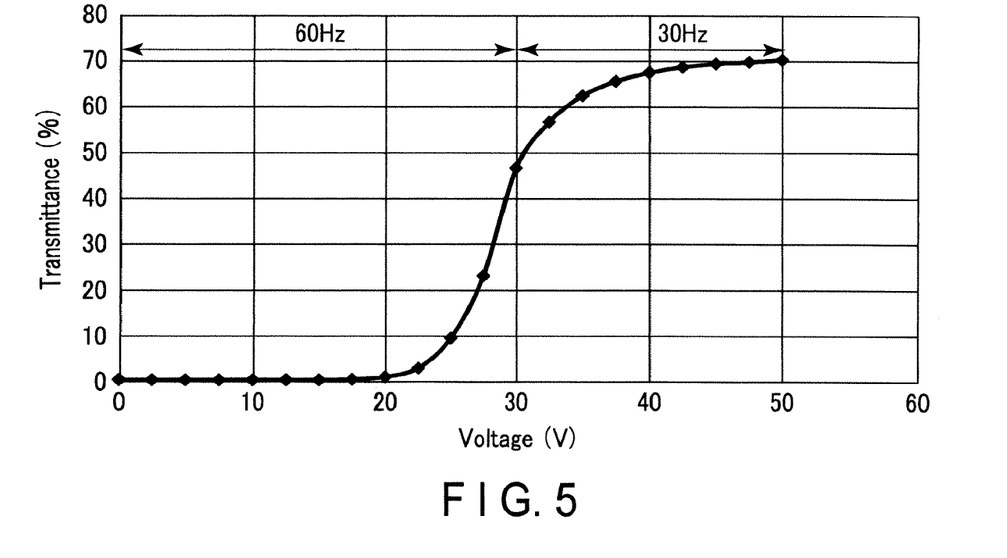
FIG. 5 is a diagram illustrating the relationship between a voltage applied to the liquid crystal panel related to a second operation example of the embodiment and a transmittance of the liquid crystal panel.

FIG. 5 is a diagram illustrating the relationship between the voltage applied to the liquid crystal panel serving as a load and the transmittance of the liquid crystal panel, in the control section 20. If the same figure is explained assuming that the applied voltage is controlled in the units of 1 [V], the frequency of a rectangular wave at a voltage of 0 (zero) [V] to 30 [V] applied to the liquid crystal panel is set to 60 [Hz], and the frequency of a rectangular wave at a voltage of 31 [V] to 50 [V] is set to 30 [Hz].

Compared to the control contents shown in FIG. 2 described above, the drive voltage is divided into two half ranges, and the drive frequency is switched and controlled with a single threshold "30 [V]" interposed between the two half ranges.

As a result, it is possible to prevent the appearance of flicker assuredly and suppress the power consumption to a certain extent, and reduce the manufacturing cost of the device by further simplifying the configuration and control of the control section, particularly the configurations and control of the microcomputer 23 and the switching circuit 22.

[Other Operation Example]

In the above embodiment, the case of using a polymer dispersed liquid crystal in the normal mode is illustrated, in which light is in an opaque diffusion state in the condition where no voltage is applied, and the transparency is increased as necessary by increasing the voltage value under a condition where a voltage is applied; however, the present invention can be similarly applied to a liquid crystal panel in a reverse mode, which has a characteristic opposite to the characteristic described above.

The driving contents of a polymer dispersed liquid crystal element itself in the reverse mode will be described below based on the assumption that the technique the reverse mode polymer dispersed liquid crystal element itself is obvious to those skilled in the art.

Figure 6:
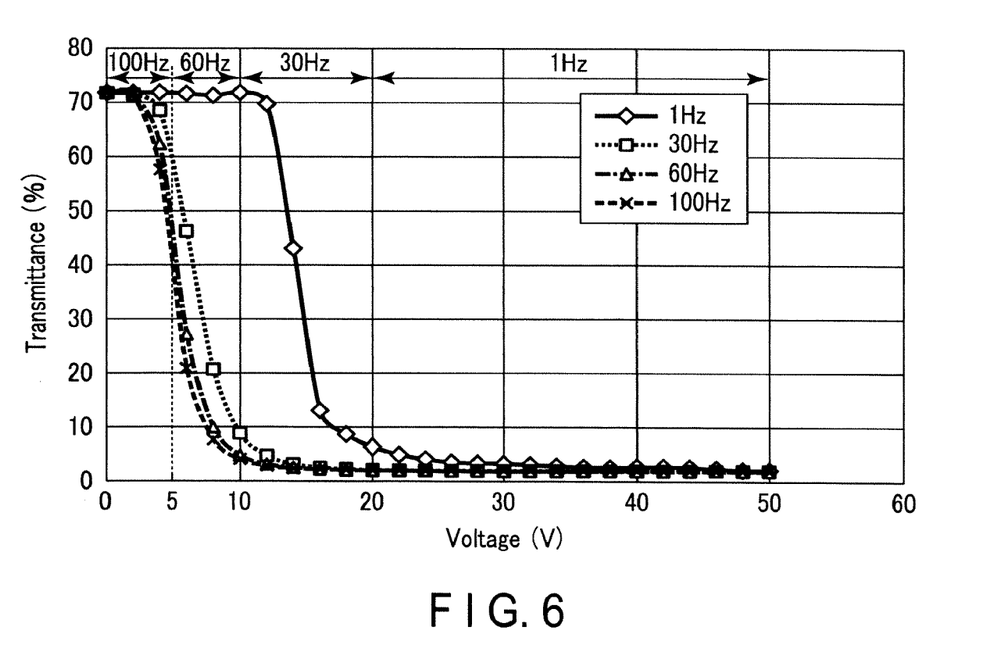
FIG. 6 is a diagram illustrating the relationship between a voltage applied for each drive frequency to a reverse mode liquid crystal panel according to the embodiment and a transmittance of the liquid crystal panel.

FIG. 6 illustrates the relationship between the voltage applied to the liquid crystal panel for each drive frequency and the transmittance of the liquid crystal panel, which is the basis of the control contents when the liquid crystal panel in the reverse mode is driven and controlled using the control section 20 in this embodiment.

From the same figure, it can be understood that the lower the drive frequency, the less the fall in transmittance, unless the drive voltage is set higher, and in particular, that the fall in transmittance is extremely slow particularly at the lowest drive frequency 1 Hz.

Here, if the same figure is explained assuming that the applied voltage is controlled in units of 1 [V], it can be considered that it is possible to realize, even in a polymer dispersed liquid crystal element in the reverse mode, control of optical modulation of a liquid crystal panel with lower power consumption while suppressing the appearance of flicker, by setting, for example, the frequency of a rectangular wave at a voltage of 0 (zero) [V] to 5 [V] applied to the liquid crystal panel to 100 [Hz], the frequency of a rectangular wave at a voltage of 6 [V] to 10 [V] to 60 [Hz], the frequency of a rectangular wave at a voltage of 11 [V] to 20 [V] to 30 [Hz], and the frequency of a rectangular wave at a voltage of 21 [V] to 50 [V] to 1 [Hz].

In each of the above-described embodiments, a liquid crystal element (optical modulation device) using a polymer dispersed liquid crystal as an object to be driven is illustrated, but the present invention is not limited thereto. The liquid crystal element may have a configuration in which a polarizing plate and an alignment film are disposed at both ends of a liquid crystal layer, and a TN (Twisted Nematic) method, a VA (Vertical Alignment) method, an IPS (In-Plane Switching) method, etc. can be used. In addition to the liquid crystal elements, various types of electro-optical elements in which the refractive index changes depending on a voltage can be used as an optical modulation element serving as a load.

The present invention is not limited to the above embodiments, and can be variously modified in the implementation stage without departing from the scope of the invention. In addition, the embodiments may be suitably implemented in combination, in which case a combined effect is obtained. Furthermore, various inventions are included in the above-described embodiments, and various inventions can be extracted by a combination selected from a plurality of the disclosed configuration requirements. For example, even if some configuration requirements are removed from all of the configuration requirements shown in the embodiments, the problem can be solved, and if an effect is obtained, a configuration from which this configuration requirement is removed can be extracted as an invention.

The invention claimed is:

1. A liquid crystal optical modulation device that performs light control drive of a liquid crystal panel using a polymer dispersed liquid crystal, the device comprising:
   an optical modulation control section that switches and sets a frequency of a drive voltage in the form of a rectangular wave applied to the liquid crystal panel using the polymer dispersed liquid crystal in accordance with a range of the drive voltage,
   wherein
   the optical modulation control section is configured to control the drive voltage to be increased continuously while keeping a condition where the drive voltage is applied to the liquid crystal panel using the polymer dispersed liquid crystal, when a state of the liquid crystal panel using the polymer dispersed liquid crystal is to be changed from an opaque and diffused state to a transparent state, and
   the optical modulation control section is further configured to control the drive voltage to be decreased continuously while keeping the condition where the drive voltage is applied to the liquid crystal panel using the polymer dispersed liquid crystal, when the state of the liquid crystal panel using the polymer dispersed liquid crystal is to be changed from the transparent state to the opaque and diffused state.

2. The liquid crystal optical modulation device according to claim 1, wherein the optical modulation control section switches and sets the frequency of the drive voltage in accordance with a comparison result between the drive voltage and a preset threshold.

3. A liquid crystal optical modulation device that performs light control drive of a liquid crystal panel, the device comprising:
   an optical modulation control section that switches and sets a frequency of a drive voltage in the form of a rectangular wave applied to the liquid crystal panel in accordance with a range of the drive voltage,
   wherein the liquid crystal panel is in an opaque and diffused state when no voltage is applied to the liquid crystal panel, and
   the optical modulation control section switches and sets the frequency of the drive voltage so as to be decreased in conjunction with an increase in the drive voltage.

4. The liquid crystal optical modulation device according to claim 3, wherein the optical modulation control section switches and sets the frequency of the drive voltage in accordance with a comparison result between the drive voltage and a preset threshold.

5. A liquid crystal optical modulation device that performs light control drive of a liquid crystal panel, the device comprising:
   an optical modulation control section that switches and sets a frequency of a drive voltage in the form of a rectangular wave applied to the liquid crystal panel in accordance with a range of the drive voltage,
   wherein
   the liquid crystal panel is in a transparent state when no voltage is applied to the liquid crystal panel, and
   the optical modulation control section switches and sets the frequency of the drive voltage so as to be decreased in conjunction with an increase in the drive voltage.

6. The liquid crystal optical modulation device according to claim 5, wherein the optical modulation control section switches and sets the frequency of the drive voltage in accordance with a comparison result between the drive voltage and a preset threshold.

* * * * *